United States Patent
Parida et al.

(10) Patent No.: US 11,472,710 B2
(45) Date of Patent: Oct. 18, 2022

(54) PROCESS FOR PREPARING PRECIPITATED SILICA

(71) Applicant: Tata Chemicals Limited, Mumbai (IN)

(72) Inventors: Prabhat Parida, Pune (IN); Sunil Rokade, Pune (IN); Debabrata Rautaray, Pune (IN)

(73) Assignee: Tata Chemicals Limited, Mumbai (IN)

( * ) Notice: Subject to any disclaimer, the term of this patent is extended or adjusted under 35 U.S.C. 154(b) by 0 days.

(21) Appl. No.: 17/042,596

(22) PCT Filed: Mar. 29, 2019

(86) PCT No.: PCT/IB2019/052584
§ 371 (c)(1),
(2) Date: Sep. 28, 2020

(87) PCT Pub. No.: WO2019/186479
PCT Pub. Date: Oct. 3, 2019

(65) Prior Publication Data
US 2021/0122642 A1   Apr. 29, 2021

(30) Foreign Application Priority Data
Mar. 29, 2018  (IN) .............................. 201821012030

(51) Int. Cl.
*C01B 33/193* (2006.01)

(52) U.S. Cl.
CPC ........ *C01B 33/193* (2013.01); *C01P 2006/12* (2013.01)

(58) Field of Classification Search
CPC ........................... C01B 33/193; C01P 2006/12
See application file for complete search history.

(56) References Cited

U.S. PATENT DOCUMENTS

| 6,180,076 | B1 | 1/2001 | Uhrlandt et al. |
| 10,894,872 | B2 * | 1/2021 | Boivin .................. C08K 5/092 |
| 2006/0100344 | A1 | 5/2006 | Stenzel et al. |

FOREIGN PATENT DOCUMENTS

WO   2014033303   3/2014

OTHER PUBLICATIONS

Waddell et al (Organic Polymer—Surface Modified Precipitated Silica, Journal of Applied Polymer Science, 1995) (Year: 1995).*

(Continued)

*Primary Examiner* — Anthony J Zimmer
*Assistant Examiner* — Logan Edward Laclair
(74) *Attorney, Agent, or Firm* — Hovey Williams LLP

(57) ABSTRACT

A process for preparing precipitated silica, is disclosed. The process includes preparing an aqueous solution of sodium silicate having a pH in a range of 10.6 to 10.8, simultaneously adding to said aqueous solution of sodium silicate, a sodium silicate solution, water and an acid in at least two phases to obtain a reaction mixture, wherein in an initial phase the sodium silicate solution, the water and the acid is added till the sodium ion concentration of the reaction mixture is in range of 0.13 normal to 0.57 normal and in a final phase the sodium silicate solution, the water and the acid is added till the sodium ion concentration of the reaction mixture is in a range of 0.3 to 0.9 normal; acidifying the reaction mixture with the acid to a pH in a range of 3 to 4.5, aging the reaction mixture to obtain precipitated silica and recovering the precipitated silica from the reaction mixture.

16 Claims, 1 Drawing Sheet

(56) References Cited

OTHER PUBLICATIONS

International Search Report and Written Opinion in corresponding PCT/IB2019/052584, dated Jul. 18, 2019.
Music, et al., "Precipitation of Amorphous SiO2 Particles and Their Properties", Brazilian Journal of Chemical Engineering, vol. 28, No. 1, Jan.-Mar. 2011, pp. 89-94.

* cited by examiner

PROCESS FOR PREPARING PRECIPITATED SILICA

RELATED APPLICATIONS

The present application is the U.S. National Stage of International Patent Application No. PCT/I82019/052584, filed Mar. 29, 2019, which is hereby incorporated by reference in its entirety, and which claims the priority benefit of Indian Patent Application No. 201821012030, filed Mar. 29, 2018.

FIELD OF DISCLOSURE

The present disclosure relates to a process of preparing precipitated silica.

BACKGROUND

Precipitated silica finds use in various applications. Surface area of silica is one of the key parameters which plays an important role in defining its wide range of applications. Surface area of the precipitated silica is determined either by the adsorption of nitrogen commonly referred to as BET (after Brunauer, Emmett and Teller) surface area) or, by the adsorption of Cetyl trimethyl ammonium bromide (CTAB) on the surface of silica (commonly referred to as CTAB surface area). BET surface area provides total surface area, whereas CTAB surface area provides external surface area of silica. The ratio of said two parameters viz. BET/CTAB provides a measure of microporosity. Pore volume and pore size distribution are also important factors which determine the rubber and filler interaction.

Although the various processes of preparing precipitated silica are known, these processes have certain disadvantages which make their application difficult/limited. Accordingly, there exists an industrial requirement for an economical, optimized process which could provide precipitated silica.

SUMMARY

A process for preparing precipitated silica is disclosed. The process includes preparing an aqueous solution of sodium silicate having a pH in a range of 10.6 to 10.8 by adding a sodium silicate solution to water at a temperature in a range of 70 degree Celsius to 160 degree Celsius, simultaneously adding to said aqueous solution of sodium silicate maintained at a reaction temperature in a range of 70 degree Celsius to 160 degree Celsius the sodium silicate solution, water and an acid in at least two phases to obtain a reaction mixture, wherein in an initial phase the sodium silicate solution, the water and the acid is added till the sodium ion concentration of the reaction mixture is in a range of 0.13 normal to 0.57 normal and in a final phase the sodium silicate solution, the water and the acid is added till the sodium ion concentration of the reaction mixture is in a range of 0.3 to 0.9 normal, acidifying the reaction mixture maintained at a reaction temperature in a range of 70 degree Celsius to 160 degree Celsius with acid to a pH in a range of 3 to 4.5; aging the reaction mixture at a temperature in a range of 70 degree Celsius to 160 degree Celsius for a time period in a range of 5 minutes to 2 hours to obtain precipitated silica; and recovering the precipitated silica from the reaction mixture; wherein the precipitated silica has a CTAB surface area in a range of 150 to 350 m²/g and a BET surface area in a range of 190 to 380 m²/g, such that the CTAB surface area of precipitated silica is inversely proportional to sodium ion concentration in the initial phase.

BRIEF DESCRIPTION OF THE FIGURES

Figure (FIG.) 1 demonstrates the increase in CTAB surface area of precipitated silica by decreasing $Na^+$ ion concentration (with surfactant) in accordance with embodiments of the present disclosure.

DETAILED DESCRIPTION

Figure 1:
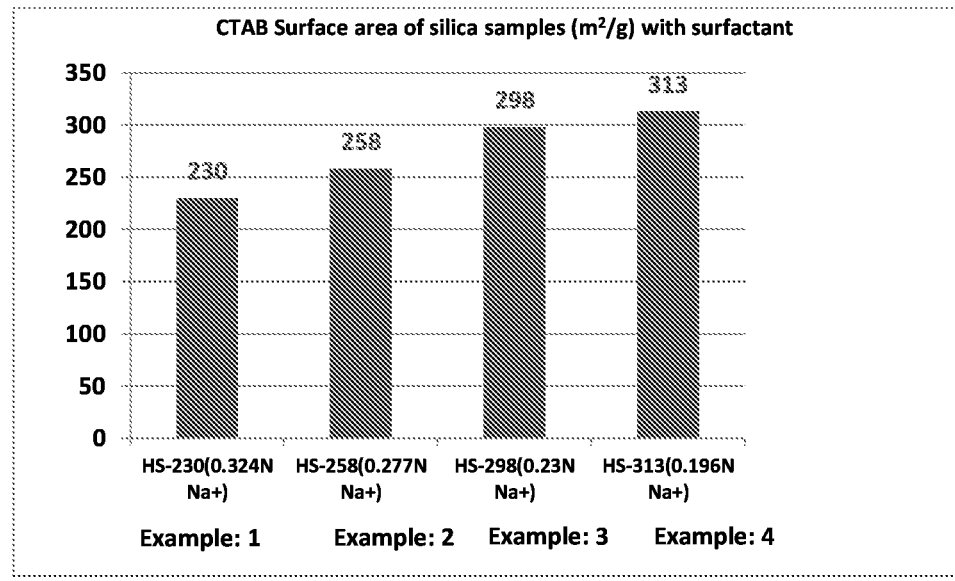
Figure 2:
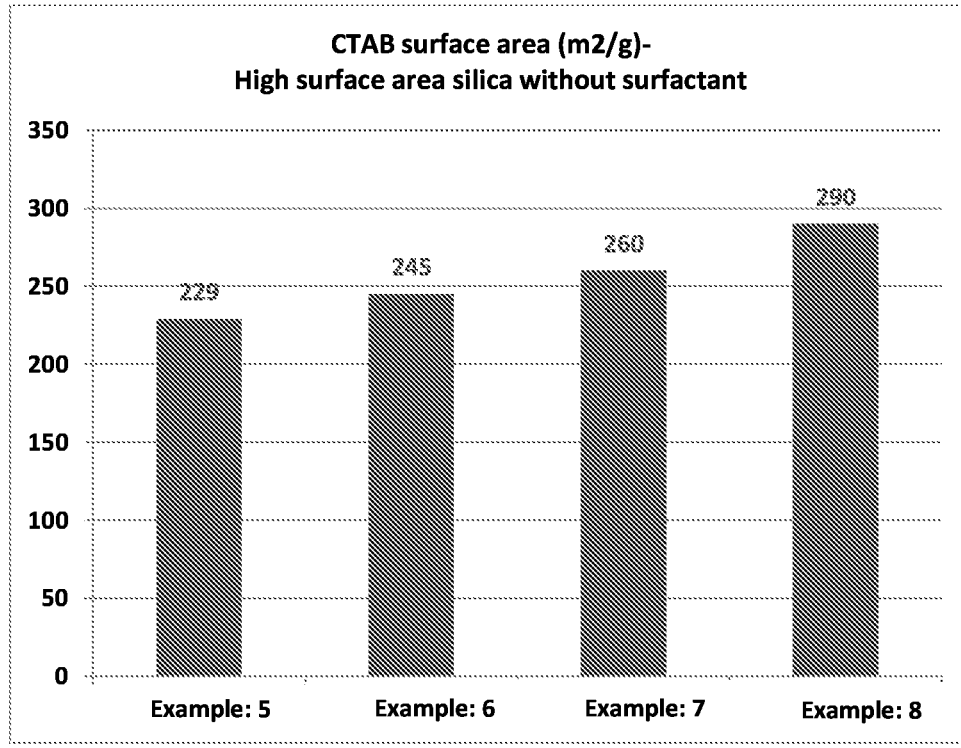
FIG. 2 shows the CTAB surface area of high surface area silica samples (without surfactant) in accordance with embodiments of the present disclosure.

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. It will be further understood by those skilled in the art that the parameters such as BET surface area, CTAB surface area, bulk density, PSD(% V) in μm, DOA, CDBP coefficient $(D_A)$, DBP absorption, Wk coefficient, sears number, have the same meaning as generally understood in the art, unless specifically stated otherwise.

Reference throughout this specification to "one embodiment" "an embodiment" or similar language means that a particular feature, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

The present disclosure relates to a process of preparing precipitated silica having specific morphology, surface area and pore volume. Specifically, the disclosure provides a process for producing precipitated silica with wide range of surface area. The process comprises:

preparing an aqueous solution of sodium silicate having a pH in a range of 10.6 to 10.8;

simultaneously adding to said aqueous solution of sodium silicate maintained at a reaction temperature in a range of 70 degree Celsius to 160 degree Celsius the sodium silicate solution, water and an acid in at least two phases to obtain a reaction mixture, wherein in an initial phase the sodium silicate solution, the water and the acid is added till the sodium ion concentration of the reaction mixture is in a range of 0.13 normal to 0.57 normal and in a final phase the sodium silicate solution, the water and the acid is added till the sodium ion concentration of the reaction mixture is in a range of 0.3 to 0.9 normal;

acidifying the reaction mixture maintained at a reaction temperature in a range of 70 degree Celsius to 160 degree Celsius with the acid to a pH in a range of 3 to 4.5;

aging the reaction mixture at a temperature in a range of 70 degree Celsius to 160 degree Celsius for a time period in a range of 5 minutes to 2 hours to obtain precipitated silica; and recovering the precipitated silica from the reaction mixture.

In accordance with an aspect, the above described process allows for the preparation of precipitated silica with wide range of surface area. The process results in obtaining precipitated silica having a CTAB surface area in the range of 150 to 350 $m^2$/g and a BET surface area in the range of 190 to 380 $m^2$/g. The CTAB surface area of precipitated silica obtained by this process is controlled by varying the sodium ion concentration that is the normality of the sodium ion in the reaction mixture in the initial phase. Specifically, the CTAB surface area of the precipitated silica is inversely proportional to sodium ion concentration in the initial phase, such that the higher the sodium ion concentration in the initial phase, the lower the CTAB surface area of the precipitated silica. By way of a specific example, when the sodium ion concentration in the initial phase of the reaction is maintained at 0.324 normal, precipitated silica having a CTAB surface area of 215-230 $m^2$/g is obtained. In another example, when the sodium ion concentration in the first phase of the reaction is maintained at 0.19 normal, precipitated silica having a CTAB surface area of 290-310 $m^2$/g is obtained.

The process as disclosed comprises preparing an aqueous solution of sodium silicate having a pH in a range of 10.6 to 10.8. In an aspect, the aqueous solution of sodium silicate having a pH in a range of 10.6 to 10.8 is prepared by adding a sodium silicate solution to water heated at a temperature in a range of 70 degree Celsius to 160 degree Celsius. In accordance with an embodiment, water is charged into a reactor with a heater and heated till the temperature of the water reaches between 70 degree Celsius to 160 degree Celsius. Preferably the water is heated to a temperature of 80 degree Celsius. To said heated water, the sodium silicate solution and water is added till the pH of the aqueous solution of sodium silicate reaches in a range of 10.6 to 10.8. In accordance with a related embodiment, the sodium silicate solution and the water are added to the heated water in a continuous manner.

In accordance with an alternate embodiment, the sodium silicate and the water are added to water heated to a temperature lower than the reaction temperature; and the aqueous solution of sodium silicate is then heated till its temperature reaches the reaction temperature. In accordance with an embodiment, during the addition of sodium silicate solution and water, water in the reactor is continuously stirred. The stirring is carried out at a stirring rate in a range of 50 to 700 rpm. Preferably, the stirring is carried out at 200 rpm.

The process further comprises adding to the aqueous solution of sodium silicate having a pH from 10.6 to 10.8, the sodium silicate solution, water and the acid simultaneously in at least two phases to obtain the reaction mixture. In the initial phase the sodium silicate solution, water and the acid is added till the sodium ion concentration of the reaction mixture is in a range of 0.13 normal to 0.57 normal. In accordance with an embodiment, the pH of the reaction mixture is maintained in range of 10.1 to 10.2 in the initial phase. In the final phase the sodium silicate solution, water and the acid is added till the sodium ion concentration of the reaction mixture is in a range of 0.3 normal to 0.9 normal. In accordance with an embodiment, pH of the reaction mixture is maintained in a range of 10.1 to 10.2 in the final stage. In an aspect, the reaction mixture is maintained at a reaction temperature in a range of 70 degree Celsius to 160 degree Celsius during the entire reaction. Preferably, the reaction mixture is maintained at a reaction temperature of 80 degree Celsius. In accordance with an embodiment, during the addition of the sodium silicate solution, water and the acid, the reaction mixture is continuously stirred. The stirring is carried out at a stirring rate in a range of 50 to 700 rpm. Preferably, the stirring is carried out at 200 rpm.

In accordance with an embodiment, between each phase, the addition of the sodium silicate solution, the water and the acid is stopped, and the reaction mixture is allowed to age for a predetermined period of time. In a related embodiment, the reaction mixture is allowed to age for a period in a range of 5 minutes to 1 hour at a temperature in a range of 70 degree Celsius to 160 degree Celsius. In accordance with a related embodiment, the reaction mixture is allowed to age for 15 minutes at a temperature of 80 degree Celsius. In accordance with an embodiment, the reaction mixture is aged under continuous stirring. The stirring is carried out at a stirring rate in a range of 50 to 700 rpm. Preferably, the stirring is carried out at 200 rpm.

In accordance with an embodiment, simultaneous addition of the sodium silicate solution, the water and the acid to the aqueous solution of sodium silicate is carried out in three phases. In the initial phase the sodium silicate solution, the water and the acid is added till the sodium ion concentration of the reaction mixture is in a range of 0.13 normal to 0.57 normal, in an intermediate phase the sodium silicate solution, the water and the acid is added till the sodium ion concentration of the reaction mixture is in a range of 0.23 normal to 0.78 normal and in the final phase the sodium silicate solution, the water and the acid is added till the sodium ion concentration of the reaction mixture is in a range of 0.3 normal to 0.9 normal. In accordance with an embodiment, the pH of the reaction mixture is maintained is in a range of 10.1 to 10.2 during all three phases.

In accordance with an embodiment, the sodium silicate solution, the acid and the water are not added in a dumping action but added continuously over a predetermined period of time. The sodium silicate solution, the acid and the water are added to the aqueous solution of sodium silicate over a time period in a range of 10 minutes to 2 hours and are preferably added over a time period of 15 minutes.

After the completion of the final phase, the acid is added to the reaction mixture to bring down the pH of the reaction mixture to 3 to 4.5. In accordance with an embodiment, the acid is added to the reaction mixture not in a dumping action but continuously over a predetermined period of time. In an aspect, the temperature of the reaction mixture is maintained at a reaction temperature in a range of 70 degree Celsius to 160 degree Celsius during the addition of the acid. Preferably, the temperature is maintained at 80 degree Celsius. In accordance with an embodiment, the reaction mixture is continuous stirring during the addition of the acid. The stirring is carried out at a stirring rate in a range of 50 to 700 rpm. Preferably, the stirring is carried out at 200 rpm.

Once the pH of the reaction mixture reaches a range from 3 to 4.5, the reaction mixture is aged at a temperature in a range of 70 degree Celsius to 160 degree Celsius for a time period in a range of 5 minutes to 2 hours to obtain precipitated silica that is then recovered from the reaction mixture. Preferably, the reaction mixture is aged at a temperature of 80 degree Celsius for 30 minutes.

In accordance with an aspect, the sodium silicate solution has sodium silicate in a range of 20% to 35% wt/wt. Preferably the sodium silicate solution has sodium silicate in an amount of 30% wt/wt. In accordance with an embodiment the sodium silicate solution has a $Na_2O$ to $SiO_2$ ratio of 1:3.2, with silica percentage by weight of 23% and $Na_2O$ percentage by weight of 7.0%. The sodium silicate solution has a pH value of 12.5±0.5.

In accordance with an aspect, the acid is selected from a group comprising sulphuric acid, hydrochloric acid, nitric acid, phosphoric acid and carbonic acid. Preferably the acid is sulphuric acid. The sulphuric acid has a 50% concentration. In accordance with an embodiment, the 50% concentrated sulphuric acid is prepared by slowly adding concentrated sulphuric acid having 98% wt/wt of sulphuric acid to distilled water. By way of an example, for preparing 10 litres of 50% concentrated sulphuric acid, 5 litres of concentrated sulphuric acid (having 98% wt/wt of sulphuric acid) is slowly added to 5 litres of water.

In accordance with an embodiment, the water is distilled water.

In accordance with an alternate embodiment, the process of preparing precipitated silica further comprises adding a surfactant to the aqueous solution of sodium silicate and the reaction mixture. In accordance with an embodiment, the surfactant may be an anionic surfactant or a cationic surfactant. The anionic surfactant is selected from a group comprising sodium dioctyl sulfosuccinate, sodium oleate, sodium and dodecyl sulphate. The cationic surfactant is cetyl tri methyl ammonium bromide.

In accordance with an embodiment, surfactant in a range of 0.5% to 4% wt/wt is added with respect to dry silica. In accordance with an aspect all the required amount of the surfactant is not added at once but is added over continuously over a predetermined period of time. In accordance with an aspect, the surfactant may be added along with the sodium silicate solution to the water during the preparation of the aqueous solution of sodium silicate. The surfactant may also be added to the reaction mixture simultaneously along with the sodium silicate solution, the water and the acid. In accordance with a related embodiment, surfactant in a range of 0.5% to 4% wt/wt is added during preparation of the aqueous solution of sodium silicate and surfactant in a range of 0.5% to 4% is added to the reaction mixture simultaneously along with the sodium silicate solution, the water and the acid, during each phase.

In accordance with an embodiment, the precipitated silica obtained upon completion of reaction is separated from the reaction mixture to obtain a silica cake. The precipitated silica may be separated by any known method including but not limited to filtration or centrifugation. The silica cake so obtained is washed with water to remove unwanted residues. In accordance with an aspect, the silica cake is washed till the total dissolved solid content of the washed liquid reaches less than 850 to 1000 ppm. The washed silica cake is homogenising to obtain a silica slurry. In an embodiment, the pH of the silica slurry is maintained in a range of 4 to 5. In a related embodiment, the pH of the silica slurry is maintained in a range of 4 to 5 by addition of sulphuric acid or ammonia. The silica slurry so obtained is dried. The slurry may be dried by any known method including but not limited to spray drying, spin drying, flash drying, or vacuum tray drying. Preferably, the slurry is spray dried.

In accordance with an embodiment, a dispersing agent may be added to the silica slurry prior to drying. The dispersing agent is selected from a group comprising metal salt of saturated and unsaturated fatty esters with long hydrocarbon chain and a mixture of salt of saturated and unsaturated fatty esters with long hydrocarbon chain. The dispersing agent is selected from a group comprising calcium oleate, zinc oleate, zinc stearate and mixtures thereof. In an embodiment dispersing agent is a blend of silica, calcium oleate, zinc oleate, and zinc stearate.

The silica according to the present disclosure can be used in tyre rubber, rice roller rubber, shoe sole rubber or any other elastomers. Specifically, the silica disclosed herein is suitable for use as filler in vulcanizable or vulcanized elastomer compositions. The vulcanized elastomer composition can be used for the manufacture of tyre and other rubber products. In accordance with an embodiment, said silica may be used as reinforcing filler in a quantity in a range of 7 to 90 phr. Any conventional process may be used to form vulcanizable or vulcanized elastomer compositions using the above disclosed silica as reinforcing filler.

Specific Embodiments are Discussed Below

Such process for preparing precipitated silica, the process comprising preparing an aqueous solution of sodium silicate having a pH in a range of 10.6 to 10.8 by adding a sodium silicate solution to water at a temperature in a range of 70 degree Celsius to 160 degree Celsius; simultaneously adding to said aqueous solution of sodium silicate maintained at a reaction temperature in a range of 70 degree Celsius to 160 degree Celsius the sodium silicate solution, water and an acid in at least two phases to obtain a reaction mixture, wherein in an initial phase the sodium silicate solution, the water and the acid is added till the sodium ion concentration of the reaction mixture is in a range of 0.13 normal to 0.57 normal and in a final phase the sodium silicate solution, the water and the acid is added till the sodium ion concentration of the reaction mixture is in a range of 0.3 to 0.9 normal; acidifying the reaction mixture maintained at a reaction temperature in a range of 70 degree Celsius to 160 degree Celsius with the acid to a pH in a range of 3 to 4.5; aging the reaction mixture at a temperature in a range of 70 degree Celsius to 160 degree Celsius for a time period in a range of 5 minutes to 2 hours to obtain precipitated silica; and recovering the precipitated silica from the reaction mixture; wherein the precipitated silica has a CTAB surface area in a range of 150 to 350 $m^2/g$ and a BET surface area in a range of 190 to 380 $m^2/g$, such that the CTAB surface area of precipitated silica is inversely proportional to sodium ion concentration in the initial phase.

Such process(s), wherein between each phase, addition of the sodium silicate solution, the water and the acid is stopped, and the reaction mixture is allowed to age for a time period in a range of 5 minutes to 1 hour at a temperature in a range of 70 degree Celsius to 160 degree Celsius.

Such process(s), wherein the simultaneous addition of the sodium silicate solution, the water and the acid to the aqueous solution of sodium silicate is carried out in three phases, wherein in the initial phase the sodium silicate solution, the water and the acid is added till the sodium ion concentration of the reaction mixture is in a range of 0.13 normal to 0.57 normal; in an intermediate phase the sodium silicate solution, the water and the acid is added till the sodium ion concentration of the reaction mixture is in a range of 0.23 normal to 0.78 normal and in the final phase the sodium silicate solution, the water and the acid is added till the sodium ion concentration of the reaction mixture is in a range of 0.3 normal to 0.9 normal.

Such process(s), wherein the sodium silicate solution, the water and the acid are simultaneously added to the aqueous solution of sodium silicate over a time period in a range of 10 minutes to 2 hours.

Such process(s), wherein the process further comprises adding to the aqueous solution of sodium silicate, a surfactant selected from a group comprising anionic surfactants selected from sodium dioctyl sulfosuccinate, sodium oleate, sodium and dodecyl sulphate and cationic surfactants selected from cetyl tri methyl ammonium bromide.

Such process(s), wherein surfactant in a range of 0.5% to 4% wt/wt is added with respect to dry silica powder.

Such process(s), wherein the sodium silicate solution has sodium silicate in a range of 20% to 35% wt/wt.

Such process(s), wherein the acid is selected from a group comprising sulphuric acid, hydrochloric acid, nitric acid, phosphoric acid and carbonic acid.

Such process(s), wherein the acid is sulphuric acid having a 50% concentration vol/vol.

Such process(s), further comprising separating the precipitated silica to obtain a silica cake; washing the silica cake with water to remove unwanted residues followed by homogenising to obtain a silica slurry; and drying the silica slurry.

Such process(s), further comprising adding to the silica slurry a dispersing agent.

Such process(s), wherein the dispersing agent is selected from a group comprising metal salt of saturated and unsaturated fatty esters with long hydrocarbon chain and a mixture of salt of saturated and unsaturated fatty esters with long hydrocarbon chain.

Such process(s), wherein the dispersing agent is selected from a group comprising calcium oleate, zinc oleate, zinc stearate or mixtures thereof.

EXAMPLES

The following examples are provided to explain and illustrate the preferred embodiments of the present disclosure and do not in any way limit the scope of the disclosure as described:

Example 1

Process of preparing precipitated silica having CTAB surface area 230 m$^2$/g in accordance with present disclosure.

A sodium silicate solution having a solid content of approximately 30% by weight (Na$_2$O to SiO$_2$ ratio of 1:3.2, silica percentage by weight of 23%, Na$_2$O percentage by weight of 7.0%) was used. The solution has a pH value of 12.5±0.5.

10 litres of 50 percent sulphuric acid solution was prepared by slowly adding 5 litres of concentrated sulphuric acid (percentage of sulphuric acid in the solution is 98 percent, specific gravity of the solution is 1.84 g/cc) to 5 litres distilled water.

To prepare the surfactant solution, 12.5 millilitre of C8 to C20 sulfosuccinate blend surfactant was added to 600 millilitres of distilled water and stirred.

To synthesize precipitated silica, 6.5 litres of distilled water was taken in a properly cleaned 30 litre reactor. The heater was set at 80° C. and the stirrer of the reactor was set at a stirring rate of 200 rpm. One litre of the 50% sulphuric acid and 4 litres of sodium silicate solution, 4 litres of distilled water, and 600 millilitre of surfactant solution were taken in four separate beakers. Four metering pumps were calibrated: 1st for the 50% sulphuric acid, 2nd for the sodium silicate solution, 3rd for water and 4th for surfactant solution. The addition rates of all the four pumps were set as follows: 1st pump for the sulphuric acid addition at 10 millilitres/minute, 2$^{nd}$ for sodium silicate solution addition at 88 millilitres/minute, 3$^{rd}$ for water addition at 266 millilitres/minute, 4$^{th}$ for surfactant solution addition at 20 millilitres/minute. When the temperature of the reactor reached 80° C., the sodium silicate pump, the water metering pump and the surfactant metering pump were switched on simultaneously at the above mentioned flow rates for 2 to 3 minutes. The pH of the solution in the reaction chamber was checked. At this point, it was ensured that the pH of the reaction mixture is between pH 10.6 to 10.8. Further on, the reaction was carried out in three phases or stages. In the initial phase (first stage), the sulphuric acid metering pump was switched on and sulphuric acid solution was added at an addition rate of 10 millilitres/minute to the reaction chamber, while continuing the addition of sodium silicate, surfactant solution and water at the addition rate of 88 millilitres/minute, 20 millilitres/minute and 266 millilitres/minute respectively. The reaction mixture is stirred at 200 rpm at 80° C. After 15 minutes, the addition of sulphuric acid, sodium silicate, surfactant solution and water were stopped while continuing the stirring at 200 rpm and 80° C. reactor temperature. The reaction mixture was then allowed to age for 15 minutes. The pH of the solution in the reaction chamber was checked to ensured that the pH of the reaction mixture is between pH 10.1 to 10.2. In the intermediate phase (second stage), the additions of sulphuric acid, sodium silicate and water were started at the addition rate of 10 millilitres/minute, 88 millilitres/minute and 266 millilitres/minute while stirring at 80° C. for next 15 minutes. After 7.5 min of the above addition, the addition of surfactant solution was continued at the rate of 20 ml/min. The pH of the solution in the reaction chamber was checked. It was ensured that the pH of the reaction mixture is between pH 10.1 to 10.2. After 15 minutes, the addition of sulphuric acid, sodium silicate, water and surfactant solution was stopped. The reaction mixture was allowed to age for 15 minutes while stirring at 80° C. In the final phase (third stage), the additions of sulphuric acid, sodium silicate, surfactant solution and water were started at the addition rate of 10 millilitres/minute, 88 millilitres/minute, 20 millilitres/minute and 266 millilitres/minute respectively while stirring at 80° C. for next 15 minutes. After 7.5 min of the above addition, the surfactant solution pump was stopped. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at a flow rate of 100 millitre/minute to reduce the pH from 10.1 to10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The cake was collected and washed thoroughly with distilled water to remove sodium sulphate. The washing was continued till the total solid content of the washed liquid reaches less than 1000 ppm. The solid content of the wet cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica was in the range of 2-5%. Post-synthesis, a detailed characterization of synthesized precipitated silica was carried out. The properties were tabulated in the below, Table 2.

Example 2

Process of preparing precipitated silica having CTAB surface area about 260 $m^2/g$ in accordance with present disclosure.

A sodium silicate solution having a solid content of approximately 30 percent by weight ($Na_2O$ to $SiO_2$ ratio of 1:3.2, silica percentage by weight of 23 percent, $Na_2O$ percentage by weight of 7.0 percent) was used. This solution has a pH value of 12.5±0.5.

10 litres of 50 percent sulphuric acid solution was prepared by adding slowly 5 litres of concentrated sulphuric acid (percentage of sulphuric acid in the solution is 98 percent, specific gravity of the solution is 1.84 g/cc) to 5 litres of distilled water.

To prepare a surfactant solution, 12.5 millilitre of C8 to C20 sulfosuccinate blend surfactant was added to 600 millilitres of distilled water and stirred.

To synthesize precipitated silica, 9.6 litres of distilled water was taken in a properly cleaned 30 litre reactor. The heater was set at 80° C. and the stirrer of the reactor was set at a stirring rate of 200 rpm. 1 litre of 50% sulphuric acid and 4 litres of sodium silicate solution, 9.0 litres of distilled water, 600 ml of surfactant solution were taken in four separate beakers. Four metering pumps were calibrated: 1st for 50% sulphuric acid, 2nd for sodium silicate solution, 3rd for water and 4th for the surfactant solution. The addition rates of all the four pumps were set as follows: 1st pump for sulphuric acid addition at 10 millilitres/minute, 2nd for sodium silicate solution addition at 88 millilitres/minute, 3rd pump for water addition at 200 millilitres/minute, 4th for surfactant solution addition at 20 millilitres/minute. When the temperature of the reactor reached 80° C., the sodium silicate pump, the water metering pump and the surfactant metering pump were switched on simultaneously at the above mentioned flow rates for 2-3 minutes. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 10 millilitres/minute to the reaction chamber, while continuing the addition of sodium silicate, surfactant solution and water at the addition rate of 88 millilitres/minute, 20 millilitres/minute and 200 millilitres/minute respectively. The reaction mixture is stirred at 200 rpm at 80° C. After 15 minutes, the addition of sulphuric acid, sodium silicate, surfactant solution and water were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (second stage), the additions of sulphuric acid, sodium silicate and water were started at the addition rate of 10 millilitres/minute, 88 millilitres/minute and 200 millilitres/minute respectively while stirring at 80° C. for next 15 minutes. After 7.5 min of the above addition, the addition of surfactant solution was continued at the rate of 20 ml/min. The pH of the solution in the reaction chamber was checked. It was ensured that the pH of the reaction mixture is between pH 10.1 to 10.2. After 15 minutes of reaction, the addition of sulphuric acid, sodium silicate and water and surfactant solution was stopped. The reaction mixture was allowed to age for 15 minutes while stirring at 80° C. In a final phase (third stage), the additions of sulphuric acid, sodium silicate, surfactant solution and water were started at the addition rate of 10 millilitres/minute, 88 millilitres/minute, 20 millilitres/minute and 200 millilitres/minute respectively while stirring at 80° C. for next 15 minutes. After 7.5 min of the above addition, the surfactant pump was stopped. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100 ml/min flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The cake was collected and washed thoroughly with approximately distilled water to remove sodium sulphate. The washing was continued till the total dissolved solid content of the washed liquid reaches less than 1000 ppm. The solid content of the wet cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out. The properties were tabulated in the below table, Table 1.

Example 3

Process of preparing precipitated silica having CTAB surface area of about 300 $m^2/g$ in accordance with present disclosure.

Sodium silicate solution used for the silica synthesis has a solid content of approximately 30% by weight.($Na_2O$ to $SiO_2$ ratio of 1:3.2, silica percentage by weight. of 23 precent, $Na_2O$ percentage by weight of 7.0%). This solution has a pH value of 12.5±0.5.

10 litres of 50 precent sulphuric acid solution was prepared by slowly adding 5 litres of concentrated sulphuric acid (percentage of sulphuric acid in the solution is 98 percent, specific gravity of the solution is 1.84 g/cc) to 5 litres of distilled water.

To prepare the surfactant solution, 12.5 millilitre of C8 to C20 sulfosuccinate blend surfactant was added to 600 millilitre of distilled water and stirred to mix in water.

To synthesize precipitated silica, 14.4 litres of distilled water were taken in a properly cleaned 30 litres reactor. The heater was set at 80° C. and the stirrer of the reactor was set at a stirring rate of 200 rpm. 1 litre of 50% sulphuric acid and 4 litres of sodium silicate solution, 4.1 litres of distilled water, and 600 ml of surfactant solution were taken in four separate beakers. Four metering pumps were calibrated: 1st for the sulphuric acid, 2nd for sodium silicate, 3rd for water and 4th for surfactant solution. The addition rates of all the four pumps were set as follows. 1st pump is for sulphuric acid addition at 10 millilitres/minute, 2nd for sodium silicate solution addition at 88 millilitres/minute, 3rd pump for water addition at 91.1 millilitres/minute, 4th for surfactant solution addition at 20 millilitres/minute. When the temperature of the reactor reached 80° C., the sodium silicate metering pump, the water metering pump and the surfactant solution metering pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 10 millilitres/minute to the reaction chamber, while continuing the addition of sodium silicate, surfactant solution and water at the addition rate of 88 millilitres/minute, 20 millilitres/minute & 91.1 millilitres/minute respectively. The reaction mixture is stirred at 200 rpm at 80° C. After 15 minutes, the addition of sulphuric acid, sodium silicate, surfactant solution and water were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (a second phase), the addition of sulphuric acid, sodium silicate and water was started at an addition rate of 10 millilitres/minute, 88 millilitres/minute and 91.1 millilitres/minute while stirring at 80° C. for next 15 minutes. After 7.5 min of the above addition, the addition of surfactant solution was stared at the rate of 20 millilitres/minute. The pH of the solution in the reaction chamber was checked. It was ensured that the pH of the reaction mixture is between pH 10.1 to 10.2. After 15 minutes of reaction, the addition of sulphuric acid, sodium silicate and water surfactant was stopped. The reaction mixture was allowed to age for 15 minutes while stirring at 80° C. In the third phase, the addition of sulphuric acid, sodium silicate, surfactant solution and water were started at the addition rate of 10 millilitres/minute, 88 millilitres/minute, 20 millilitres/minute and 91.1 millilitres/minute respectively while stirring at 80° C. for next 15 minutes. After 7.5 min of the above addition, the surfactant solution pump was stopped. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100milliliters/minutes flow rate to reduce the pH from 10.1-10.2 to 3.5-4.0. After pH adjustment, the addition of 50% sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The cake was collected and washed thoroughly with distilled water to remove sodium sulphate. The washing was continued till the total dissolved solid content of the washed liquid reaches less than 1000 ppm. The solid content of the wet cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out. The properties were tabulated in the below table, Table 1.

Example 4

Process of preparing precipitated silica having CTAB surface area of approximately 310 m$^2$/g in accordance with present disclosure.

A sodium silicate solution having a solid content of approximately 30% by weight (Na$_2$O to SiO$_2$ ratio of 1:3.2, silica percentage by weight of 23%, Na$_2$O percentage by weight of 7.0%) was used. This solution has a pH value of 12.5±0.5.

10 litres of 50% sulphuric acid solution was prepared by slowly adding 5 litres of concentrated sulphuric acid (percentage of sulphuric acid in the solution is 98%, specific gravity of the solution is 1.84 g/cc) to 5 litres distilled water.

To prepare the surfactant solution, 12.5 millilitre of C8 to C20 sulfosuccinate blend surfactant was added to 600 millilitre of distilled water and stirred to mix in water.

To synthesize precipitated silica, 18.6 litres of distilled water was taken in a properly cleaned 30 litres reactor. The heater was set at 80° C. and the stirrer of the reactor was set at a stirring rate of 200 rpm. 1 litre of 50% sulphuric acid, 4 litres of sodium silicate solution and 600 millilitre of surfactant solution were taken in three separate beakers. Three metering pumps were calibrated: 1st for sulphuric acid, 2nd for sodium silicate, 3rd for surfactant solution. The addition rates of all the four pumps were set as follows. 1st pump for sulphuric acid addition at 10 millilitres/minute, 2nd for sodium silicate solution addition at 88 millilitres/minute, 3rd for surfactant solution addition at 20 millilitres/minute. When the temperature of the reactor reached 80° C., the sodium silicate pump and the surfactant metering pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 10 millilitres/minute to the reaction chamber, while continuing the addition of both sodium silicate, surfactant solution at the addition rate of 88 millilitres/minute and 20 millilitres/minute respectively. The reaction mixture is stirred at 200 rpm at 80° C. After 15 minutes, the addition of sulphuric acid, sodium silicate and surfactant were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In the second phase, the additions of sulphuric acid and sodium silicate was started at an addition rate of 10 millilitres/minute and 88 millilitres/minute while stirring at 80° C. for next 15 minutes. After 7.5 min of the above addition, the addition of surfactant solution was continued at the rate of 20 millilitres/minutes. The pH of the solution in the reaction chamber was checked. It was ensured that the pH of the reaction mixture is between pH 10.1 to 10.2. After 15 minutes of reaction, the addition of sulphuric acid, sodium silicate and surfactant solution were stopped. The reaction mixture was allowed to age for 15 minutes while stirring at 80° C. In a final phase (third stage), the additions of sulphuric acid, sodium silicate, and surfactant solution was started at the addition rate of 10 millilitres/minute, 88 millilitres/minute and 20 millilitres/minute respectively while stirring at 80° C. for next 15 minutes. After 7.5 min of the above addition, the surfactant solution pump was stopped. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100millilitres/minute flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The cake was collected and washed thoroughly with approximately distilled water to remove sodium sulphate. The washing was continued till the total dissolved solid content of the washed liquid reaches less than 1000 ppm. The solid content of the wet cake thus obtained was checked and found to be 12 15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out.

The sodium ion concentrations maintained in the reactions specified in Example 1 to 4 and the surface area obtained are tabulated in the below Table 1 and 2.

TABLE 1

Sodium ion concentrations maintained at different phases of silica precipitation reactions (with surfactant)

| Example | Initial Phase | Intermediate Phase | Final Phase |
|---|---|---|---|
| Example-1 | Na+ = 0.324N | Na+ = 0.44N | Na+ = 0.5N |
| Example-2 | Na+ = 0.277N | Na+ = 0.418N | Na+ = 0.5N |
| Example-3 | Na+ = 0.23N | Na+ = 0.391N | Na+ = 0.5N |
| Example-4 | Na+ = 0.196N | Na+ = 0.36N | Na+ = 0.5N |

TABLE 2

Properties of high surface area silica obtained in Examples 1 to 3 (with surfactant)

| Sr. No | Properties | Example-4 | Example-3 | Example-2 | Example-1 |
|---|---|---|---|---|---|
| 1 | CTAB (Titration) ($m^2/g$) | 298-313 | 282-292 | 250-258 | 220-240 |
| 2 | pH of 5% silica | 6.39 | 6.49 | 6.65 | 6.56 |
| 3 | Bulk density (g/l) | 190 | 178 | 135 | 125 |
| 4 | DOA (ml/100 g) | 260 | 280 | 310 | 320 |
| 5 | CDBP value | | 0.49 | 0.5 | 0.5 |
| 6. | BET surface area ($m^2/g$) | 333.13 | 299.05 | 281.45 | 258.12 |

Example 5

Process of preparing precipitated silica having CTAB surface area 229 $m^2/g$ in accordance with present disclosure.

A sodium silicate solution having a solid content of about 30% by weight ($Na_2O$ to $SiO_2$ ratio of 1:3.2, silica percentage by weight of 23%, $Na_2O$ percentage by weight of 7.0%) was used. This solution has a pH value of 12.5±0.5.

10 litres 50% of sulphuric acid solution was prepared by slowly adding 5 litres of concentrated sulphuric acid percentage of sulphuric acid in the solution is 98%, specific gravity of the solution is1.84 g/cc) to 5 litres of distilled water.

To synthesize precipitated silica, 6.5 litres of distilled water was taken in a properly cleaned 30 litres reactor. The heater was set at 80° C. and the stirrer of the reactor was set at a stirring rate of 200 rpm. 1 litre of 50% sulphuric acid, and 4 litres of sodium silicate solution and 4 litres of distilled water were taken in three separate beakers. Three metering pumps were calibrated: $1^{st}$ for sulphuric acid, $2^{nd}$ for sodium silicate, and $3^{rd}$ for water. The addition rates of all the three pumps was set as follows. $1^{st}$ pump for sulphuric acid addition at 10 millilitres/minute, 2nd pump for sodium silicate solution addition at 88 millilitres/minute, $3^{rd}$ pump for water addition at 266 millilitres/minute. When the temperature of the reactor reached 80° C., the sodium silicate pump, the water pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In the initial phase (first stage), the sulphuric acid metering pump was switched on and sulphuric acid solution was added at an addition rate of 10 millilitres/minute to the reaction chamber, while continuing the addition of sodium silicate and water at the addition rate of 88 millilitres/minute and 266 millilitres/minute respectively. The reaction mixture is stirred at 200 rpm at 80° C. After 15 minutes, the addition of sulphuric acid, sodium silicate and water were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (second stage), the additions of sulphuric acid, sodium silicate and water were started at the addition rate of 10 millilitres/minute, 88 millilitres/minute and 266 millilitres/minute while stirring at 80° C. for next 15 minutes. The pH of the solution in the reaction chamber was checked. It was ensured that the pH of the reaction mixture is between pH 10.1 to 10.2. After 15 minutes of reaction, the addition of sulphuric acid, sodium silicate and water was stopped. The reaction mixture was allowed to age for 15 minutes while stirring at 80° C. In the third phase, the additions of sulphuric acid, sodium silicate and water were started at the addition rate of 10 millilitres/minute, 88 millilitres/minute and 266 millilitres/minute respectively while stirring at 80° C. for next 15 minutes. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100 millilitres/minute flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The silica cake was collected and washed thoroughly with distilled water to remove sodium sulphate. The washing was continued till the total dissolved solid content of the washed liquid reaches less than 1000 ppm. The solid content of the wet silica cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out.

Example 6

Process of preparing precipitated silica having CTAB surface area 245 m²/g in accordance with present disclosure.

Sodium silicate solution used for the silica synthesis has a solid content of about 30% by weight ($Na_2O$ to $SiO_2$ ratio of 1:3.2, silica percentage by weight of 23%, $Na_2O$ percentage by weight of 7.0%). This solution has a pH value of 12.5±0.5.

10 litres of 50% sulphuric acid solution was prepared by slowly adding 5 litres of concentrated sulphuric acid (percentage of sulphuric acid in the solution is 98%, specific gravity of the solution is 1.84 g/cc) to 5 litres of distilled water.

To synthesize precipitated silica, 9.6 litres of distilled water was taken in a properly cleaned 25 litres reactor. The heater was set at 80° C. and the stirrer of the reactor was set at a stirring rate of 200 rpm. 1 litre of 50% sulphuric acid, 4 litres of sodium silicate solution, and 9.0 litres of distilled water were taken in three separate beakers. Three metering pumps were calibrated: $1^{st}$ for sulphuric acid, $2^{nd}$ for sodium silicate addition, and $3^{rd}$ for water. The addition rates of all the three pumps was set as follows: $1^{st}$ pump for sulphuric acid addition at 10 millilitres/minute, 2nd pump for sodium silicate solution addition at 88 millilitres/minute, $3^{rd}$ pump for water addition at 200 millilitres/minute. When the temperature of the reactor reached 80° C., the sodium silicate pump, the water metering pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 10 millilitres/minute to the reaction chamber, while continuing the addition of sodium silicate and water at the addition rate of 88 millilitres/minute and 200 millilitres/minute respectively. The reaction mixture is stirred at 200 rpm at 80° C. After 15 minutes, the addition of sulphuric acid, sodium silicate and water were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (second phase), the additions of sulphuric acid, sodium silicate and water were started at the addition rate of 10 millilitres/minute, 88 millilitres/minute and 200 millilitres/minute while stirring at 80° C. for next 15 minutes. The pH of the solution in the reaction chamber was checked. It was ensured that the pH of the reaction mixture is between pH 10.1 to 10.2. After 15 minutes of reaction, the addition of sulphuric acid, sodium silicate and water was stopped. The reaction mixture was allowed to age for 15 minutes while stirring at 80° C. In a final phase (third stage), the addition of sulphuric acid, sodium silicate and water were started at the addition rate of 10 millilitres/minute, 88 millilitres/minute and 200 millilitres/minute respectively while stirring at 80° C. for next 15 minutes. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100 millilites/minutes flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The silica cake was collected and washed thoroughly with distilled water to remove sodium sulphate. The washing was continued till the total dissolved solid content of the washed liquid reaches less than 1000 ppm. The solid content of the wet cake thus obtained was checked and found to be 12 15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out. The properties were tabulated in the below Table 3 and 4.

Example 7

Process of preparing precipitated silica having CTAB surface area 260 m²/g in accordance with present disclosure.

Sodium silicate solution used for the silica synthesis has a solid content of about 30% by weight. ($Na_2O$ to $SiO_2$ ratio of 1:3.2, silica percentage by weight of 23%, $Na_2O$ percentage by weight of 7.0%). This solution has a pH value of 12.5±0.5.

10 litres of 50% sulphuric acid solution was prepared by slowly adding 5 litres of concentrated sulphuric acid (percentage of sulphuric acid in the solution is 98%, specific gravity of the solution is 1.84 g/cc) to 5 litres of distilled water.

To synthesize precipitated silica, 14.4 litres of distilled water was taken in a properly cleaned 30 litres reactor. The heater was set at 80° C. and the stirrer of the reactor was set at a stirring rate of 200 rpm. 1 litre of 50% sulphuric acid, 4 litres of sodium silicate solution, and 4.1 litres of distilled water was taken in three separate beakers. Three metering pumps were calibrated: $1^{st}$ for sulphuric acid, $2^{nd}$ for sodium silicate and $3^{rd}$ for water. The addition rates of all the three pumps were set as follows: $1^{st}$ pump for sulphuric acid addition at 10 millilitres/minute, 2nd for sodium silicate solution addition at 88 millilitres/minute, $3^{rd}$ pump for water addition at 91.1 millilitres/minute. When the temperature of the reactor reached 80° C., the sodium silicate pump, the water metering pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three stages. In an initial phase (first stage), the sulphuric acid metering pump was switched on and sulphuric acid solution was added at an addition rate of 10 millilitres/minute to the reaction chamber, while continuing the addition of sodium silicate and water at the addition rate of 88 millilitres/minute and 91.1 millilitres/minute respectively. The reaction mixture is stirred at 200 rpm at 80° C. After 15 minutes, the addition of sulphuric acid, sodium silicate and water were stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (second stage), the addition of sulphuric acid, sodium silicate and water were started at the addition rate of 10 millilitres/minute, 88 millilitres/minute and 91.1 millilitres/minute while stirring at 80° C. for next 15 minutes. The pH of the solution in the reaction chamber was checked. It was ensured that the pH of the reaction mixture is between pH 10.1 to 10.2. After 15 minutes of reaction, the addition of sulphuric acid, sodium silicate and water was stopped. The reaction mixture was allowed to age for 15 minutes while stirring at 80° C. In the final phase (third stage), the addition of sulphuric acid, sodium silicate and water were started at the addition rate of 10 millilitres/minute, 88 millilitres/minute and 91.1 millilitres/minute respectively while stirring at 80° C. for next 15 minutes. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100millilitre/minute flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The silica cake was collected and washed thoroughly with distilled water to remove sodium sulphate. The washing was continued till the total dissolved solid content of the washed liquid reaches less than 1000 ppm. The solid content of the wet silica cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out.

Example 8

Process of preparing precipitated silica having CTAB surface area 290 $m^2$/g in accordance with present disclosure.

Sodium silicate solution used for the silica synthesis has a solid content of about 30% by weight ($Na_2O$ to $SiO_2$ ratio of 1:3.2, silica percentage by weight of 23%, $Na_2O$ percentage by weight of 7.0%). This solution has a pH value of 12.5±0.5.

10 litres of 50% sulphuric acid solution was prepared by slowly adding 5 litres of concentrated sulphuric acid (percentage of sulphuric acid in the solution is 98%, specific gravity of the solution is 1.84 g/cc) to 5 litres of distilled water.

To synthesize precipitated silica, 18.6 litres of distilled water was taken in a properly cleaned 30 litres reactor. The heater was set at 80° C. and the stirrer of the reactor was set at a stirring rate of 200 rpm. One litre of 50% sulphuric acid, 4 litres of sodium silicate solution were taken in two separate beakers. Two metering pumps were calibrated: $1^{st}$ for sulphuric acid, and $2^{nd}$ for sodium silicate. The addition rates of the two pumps were set as follows: $1^{st}$ pump for sulphuric acid addition at 10 millilitres/minute, 2nd for sodium silicate solution addition at 88 millilitres/minute. When the temperature of the reactor reached 80° C., the sodium silicate pump was switched on at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 10 millilitres/minute to the reaction chamber, while continuing the addition of sodium silicate at the addition rate of 88 millilitres/minute. The reaction mixture is stirred at 200 rpm at 80° C. After 15 minutes, the addition of sulphuric acid, sodium silicate was stopped while continuing the stirring at 200 rpm and 80° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (second stage), the additions of sulphuric acid, sodium silicate were started at the addition rate of 10 millilitres/minute, 88 millilitres/minute while stirring at 80° C. for next 15 minutes. The pH of the solution in the reaction chamber was checked. It was ensured that the pH of the reaction mixture is between pH 10.1 to 10.2. After 15 minutes of reaction, the addition of sulphuric acid, and sodium silicate was stopped. The reaction mixture was allowed to age for 15 minutes while stirring at 80° C. In a final phase (third stage), the additions of sulphuric acid, and sodium silicate were started at the addition rate of 10 millilitres/minute, 88 millilitres/minute respectively while stirring at 80° C. for next 15 minutes. It was ensured that the pH of the reaction mixture is between pH 10.1 to 10.2. The reaction mixture was allowed to age for 15 minutes while stirring at 80° C. After 15 minutes of ageing, 50% sulphuric acid solution was added at 100 millilitre/minute flow rate to reduce the pH from 10.1-10.2 to 3.5-4.0. After pH adjustment, the addition of sulphuric acid was stopped. The reaction mixture was allowed to age for 30 minutes at 80° C. with continuous stirring.

At the end of the reaction, the precipitated slurry was collected from the reactor. The precipitate was centrifuged at 4000 rpm for 5 minutes. The silica cake was collected and washed thoroughly with distilled water to remove sodium sulphate. The washing was continued till the total dissolved solid content of the washed liquid reaches less than 1000 ppm. The solid content of the wet silica cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out.

The sodium ion concentrations maintained in the reactions specified in Example 5 to 8 and the surface area obtained are tabulated in the below Table 3 and 4.

TABLE 3

Sodium ion concentrations maintained at different phases of silica precipitation reactions (without surfactant)

| Examples | Initial Phase | Intermediate Phase | Final Phase |
|---|---|---|---|
| Example-5 | $Na^+$ = 0.324N | $Na^+$ = 0.44N | $Na^+$ = 0.5N |
| Example-6 | $Na^+$ = 0.277N | $Na^+$ = 0.418N | $Na^+$ = 0.5N |
| Example-7 | $Na^+$ = 0.23N | $Na^+$ = 0.391N | $Na^+$ = 0.5N |
| Example-8 | $Na^+$ = 0.196N | $Na^+$ = 0.36N | $Na^+$ = 0.5N |

TABLE 4

Properties of high surface area silica (prepared without surfactant)

| Sr. No | Properties | Example-8 | Example-7 | Example-6 | Example-5 |
|---|---|---|---|---|---|
| 1 | CTAB (Titration) ($m^2/g$) | 290 | 260 | 245 | 229 |
| 2 | pH of 5% silica | 6.45 | 6.78 | 6.58 | 6.50 |
| 3 | Bulk density (g/l) | 125 | 220 | 222 | 245 |
| 4 | DOA (ml/100 g) | 220-230 | 220-230 | 240-250 | 260 |
| 5 | CDBP value | 0.5 | 0.48 | 0.5 | 0.5 |

Example 9

Process of preparing precipitated silica having CTAB surface area of about 180 $m^2/g$ in accordance with present disclosure.

Sodium silicate solution used for the silica synthesis has a solid content of approximately 30% by weight ($Na_2O$ to $SiO_2$ ratio of 1:3.2, silica percentage by weight of 23 percent, $Na_2O$ percentage by weight of 7.0%). This solution has a pH value of 12.5±0.5.

10 litres of 50 percent sulphuric acid solution was prepared by slowly adding 5 litres of concentrated sulphuric acid (percentage of sulphuric acid in the solution is 98 percent, specific gravity of the solution is 1.84 g/cc) to 5 litres of distilled water.

To prepare the surfactant solution, 18 millilitre of C8 to C20 sulfosuccinate blend surfactant was added to 600 millilitre of distilled water and stirred to mix in water.

To synthesize precipitated silica, 12 litres of distilled water were taken in a properly cleaned 30 litres reactor. The heater was set at 90° C. and the stirrer of the reactor was set at a stirring rate of 200 rpm. 1 litre of 50% sulphuric acid and 6.26 litres of sodium silicate solution, 4.14 litres of distilled water, and 600 ml of surfactant solution were taken in four separate beakers. Four metering pumps were calibrated: 1st for the sulphuric acid, 2nd for sodium silicate, 3rd for water and 4th for surfactant solution. The addition rates of all the four pumps were set as follows. 1st pump is for sulphuric acid addition at 20 millilitres/minute, 2nd for sodium silicate solution addition at 139 millilitres/minute, 3rd pump for water addition at 92 millilitres/minute, 4th for surfactant solution addition at 20 millilitres/minute. When the temperature of the reactor reached 90° C., the sodium silicate metering pump, the water metering pump and the surfactant solution metering pump were switched on simultaneously at the above mentioned flow rates for 2-3 minutes to the reaction chamber. The pH of the solution in the reaction chamber was checked. At this point, it was ensured that the pH of the reaction mixture is between pH 10.6 to 10.8. Further on, the reaction was carried out in three phases or stages. In an initial phase (first stage), the sulphuric acid metering pump was switched on and sulphuric acid solution was added at an addition rate of 20 millilitres/minute to the reaction chamber, while continuing the addition of sodium silicate, surfactant solution and water at the addition rate of 139 millilitres/minute, 20 millilitres/minute and 92 millilitres/minute respectively. The reaction mixture is stirred at 200 rpm at 90° C. After 15 minutes, the addition of sulphuric acid, sodium silicate, surfactant solution and water were stopped while continuing the stirring at 200 rpm and 90° C. reactor temperature. The reaction mixture was then allowed to age for 15 minutes. The pH of the solution in the reaction chamber was checked. At this point, it was ensured that the pH of the reaction mixture is between pH 10.1 to 10.2. In an intermediate phase (a second phase), the addition of sulphuric acid, sodium silicate and water was started at an addition rate of 20 millilitres/minute, 139 millilitres/minute and 92 millilitres/minute while stirring at 90° C. for next 15 minutes. After 7.5 min of the above addition, the addition of surfactant solution was stared at the rate of 20 millilitres/minute. The pH of the solution in the reaction chamber was checked. It was ensured that the pH of the reaction mixture is between pH 10.1 to 10.2. After 15 minutes of reaction, the addition of sulphuric acid, sodium silicate and water surfactant was stopped. The reaction mixture was allowed to age for 15 minutes while stirring at 90° C. In the third phase, the addition of sulphuric acid, sodium silicate, surfactant solution and water were started at the addition rate of 20 millilitres/minute, 139 millilitres/minute, 20 millilitres/minute and 92 millilitres/minute respectively while stirring at 90° C. for next 15 minutes. After 7.5 min of the above addition, the surfactant solution pump was stopped. It was ensured that the pH of the reaction mixture is between pH 10.1 to 10.2. The reaction mixture was allowed to age for 15 minutes while stirring at 90° C. After 15 minutes of ageing, 50% sulphuric acid solution was added at 100 milliliters/minutes flow rate to reduce the pH from 10.1-10.2 to 3.5-4.0. After pH adjustment, the addition of 50% sulphuric acid was stopped. The reaction mixture was allowed to age for 30 minutes at 90° C. with continuous stirring.

At the end of the reaction, the precipitated slurry was collected from the reactor. The precipitate was centrifuged at 4000 rpm for 5 minutes. The cake was collected and washed thoroughly with distilled water to remove sodium sulphate. The washing was continued till the total dissolved solid content of the washed liquid reaches less than 1000 ppm. The solid content of the wet cake thus obtained was checked and found to be 12-15% by drying at 125° C. The washed silica cake was homogenized to make silica slurry with total silica content of 10-12%. 2-4% (w/w) metal salt of saturated and unsaturated fatty esters with long hydrocarbon chain/fatty acids was added to the silica slurry as dispersing agent followed by homogenization. The pH of the slurry was maintained at 5-6 by addition of sulphuric acid or ammonia. The resultant slurry was then spray dried to powder. The moisture content of spray dried silica should be in the range of 2-5%. Post synthesis, a detailed characterization of synthesized precipitated silica was carried out.

The sodium ion concentrations maintained in the reaction specified in Example 9, and the surface area obtained are tabulated in the Table 5 and 6 below.

TABLE 5

Sodium ion concentrations maintained at different phases of silica precipitation reactions.

| Example | Initial Phase | Intermediate Phase | Final Phase |
|---|---|---|---|
| Example-9 (with surfactant) | $Na^+$ = 0.366N | $Na^+$ = 0.588N | $Na^+$ = 0.737N |

TABLE 6

Properties of high surface area silica obtained in Examples 9

| Sr. No | Properties | Example-9 |
|---|---|---|
| 1 | CTAB(Titration) ($m^2/g$) | 180 |
| 2 | pH of 5% silica | 6.4 |
| 3 | Bulk density (g/l) | 180 |
| 4 | DOA (ml/100 g) | 240 |
| 5 | CDBP value | 0.5 |

INDUSTRIAL APPLICABILITY

The process as disclosed allows for the synthesis of precipitated silica of different surface areas in a simple and efficient manner by simply controlling the sodium ion concentration during the reaction and precipitation process while keeping other reaction parameters unchanged.

Furthermore, as the developed process is aligned with existing precipitated silica synthesis and only requires maintaining desired sodium ion concentration during the reaction, it does not require any modification to the existing manufacturing set-up.

We claim:

1. A process for preparing precipitated silica, the process comprising:
   preparing an aqueous solution of sodium silicate having a pH in a range of 10.6 to 10.8 by adding a sodium silicate solution to water at a temperature in a range of 70 degree Celsius to 160 degree Celsius;
   simultaneously adding to said aqueous solution of sodium silicate maintained at a reaction temperature in a range of 70 degree Celsius to 160 degree Celsius the sodium silicate solution, water and an acid in at least two phases to obtain a reaction mixture, wherein in an initial phase the sodium silicate solution, the water and the acid is added until the sodium ion concentration of the reaction mixture is in a range of 0.13 normal to 0.57 normal and in a final phase the sodium silicate solution, the water and the acid is added until the sodium ion concentration of the reaction mixture is in a range of 0.3 to 0.9 normal;
   acidifying the reaction mixture maintained at a reaction temperature in a range of 70 degree Celsius to 160 degree Celsius with the acid to a pH in a range of 3 to 4.5;
   aging the reaction mixture at a temperature in a range of 70 degree Celsius to 160 degree Celsius for a time period in a range of 5 minutes to 2 hours to obtain precipitated silica; and
   recovering the precipitated silica from the reaction mixture; wherein the precipitated silica has a CTAB surface area in a range of 150 to 350 $m^2/g$ and a BET surface area in a range of 190 to 380 $m^2/g$, such that the CTAB surface area of precipitated silica is inversely proportional to sodium ion concentration in the initial phase.

2. The process as claimed in claim 1, wherein between each phase, addition of the sodium silicate solution, the water and the acid is stopped, and the reaction mixture is allowed to age for a time period in a range of 5 minutes to 1 hour at a temperature in a range of 70 degree Celsius to 160 degree Celsius.

3. The process as claimed in claim 2, wherein the simultaneous addition of the sodium silicate solution, the water and the acid to the aqueous solution of sodium silicate is carried out in three phases, wherein in the initial phase the sodium silicate solution, the water and the acid is added until the sodium ion concentration of the reaction mixture is in a range of 0.13 normal to 0.57 normal; in an intermediate phase the sodium silicate solution, the water and the acid is added until the sodium ion concentration of the reaction mixture is in a range of 0.23 normal to 0.78 normal and in the final phase the sodium silicate solution, the water and the acid is added until the sodium ion concentration of the reaction mixture is in a range of 0.3 normal to 0.9 normal.

4. The process as claimed in claim 1, wherein the sodium silicate solution, the water and the acid are simultaneously added to the aqueous solution of sodium silicate over a time period in a range of 10 minutes to 2 hours.

5. The process as claimed in claim 1, wherein the process further comprises adding a surfactant to the aqueous solution of sodium silicate.

6. The process as claimed in claim 5, wherein surfactant in a range of 0.5% to 4% wt/wt is added with respect to dry precipitated silica powder.

7. The process as claimed in claim 1, wherein the sodium silicate solution has a molarity of sodium silicate in a range of 1.96 moles/litre to 3.87 moles/litre.

8. The process as claimed in claim 1, wherein the acid is selected from the group consisting of sulphuric acid, hydrochloric acid, nitric acid, phosphoric acid, and carbonic acid.

9. The process as claimed in claim 1, wherein the acid is sulphuric acid having a 50% concentration vol/vol.

10. The process as claimed in claim 1, further comprising separating the precipitated silica to obtain a silica cake; washing the silica cake with water to remove unwanted residues followed by homogenising to obtain a silica slurry; and drying the silica slurry.

11. The process as claimed in claim 10, further comprising adding to the silica slurry a dispersing agent.

12. The process as claimed in claim 11, wherein the dispersing agent is selected from the group consisting of metal salt of saturated and unsaturated fatty esters with long hydrocarbon chain and a mixture of salt of saturated and unsaturated fatty esters with long hydrocarbon chain.

13. The process as claimed in claim 11, wherein the dispersing agent comprises calcium oleate, zinc oleate, zinc stearate or mixtures thereof.

14. The process as claimed in claim 5, wherein the surfactant is an anionic surfactant selected from the group consisting of sodium dioctyl sulfosuccinate, sodium oleate, and sodium dodecyl sulphate.

15. The process as claimed in claim 5, wherein the surfactant is a cationic surfactant.

16. The process as claimed in claim 15, wherein the cationic surfactant is cetyl tri methyl ammonium bromide.

* * * * *